(12) United States Patent
Ando et al.

(10) Patent No.: US 12,297,364 B2
(45) Date of Patent: May 13, 2025

(54) INK SET AND RECORDING METHOD

(71) Applicant: SEIKO EPSON CORPORATION, Tokyo (JP)

(72) Inventors: Keigo Ando, Matsumoto (JP); Mitsuaki Kosaka, Minowa (JP)

(73) Assignee: SEIKO EPSON CORPORATION (JP)

( * ) Notice: Subject to any disclaimer, the term of this patent is extended or adjusted under 35 U.S.C. 154(b) by 359 days.

(21) Appl. No.: 17/889,668

(22) Filed: Aug. 17, 2022

(65) Prior Publication Data

US 2023/0072577 A1 Mar. 9, 2023

(30) Foreign Application Priority Data

Aug. 18, 2021 (JP) .................................. 2021-133328

(51) Int. Cl.
 *C09D 11/40* (2014.01)
 *B41J 2/01* (2006.01)
 (Continued)

(52) U.S. Cl.
 CPC ................. *C09D 11/40* (2013.01); *B41J 2/01* (2013.01); *B41J 2/2117* (2013.01);
 (Continued)

(58) Field of Classification Search
 CPC ... B41J 2/01; B41J 2/211; B41J 2/1433; B41J 2/17; B41J 2/17593; B41J 2/2107;
 (Continued)

(56) References Cited

U.S. PATENT DOCUMENTS

| 2001/0020964 A1* | 9/2001 | Irihara | ................... B41J 2/2114 347/43 |
| 2010/0295891 A1* | 11/2010 | Goto | ...................... B41J 2/2107 347/21 |

(Continued)

FOREIGN PATENT DOCUMENTS

| CN | 110272661 A | 9/2019 |
| JP | 2017-165982 A | 9/2017 |

(Continued)

OTHER PUBLICATIONS

BYK-Chemie Japan Co., Ltd., "BYK-348 Data Sheet", Tokyo, Japan, Feb. 2013, with English translation, pp. 1-3 (6 Total Pages).

*Primary Examiner* — Manish S Shah

(74) *Attorney, Agent, or Firm* — Harness, Dickey & Pierce, P.L.C.

(57) ABSTRACT

An ink set includes a non-white ink composition and a white ink composition, and the non-white ink composition and the white ink composition are each an aqueous ink jet ink. The non-white ink composition contains a silicone-based surfactant A having a maximum peak within a molecular weight range of 3,000 to 20,000 within a molecular weight range of 300 or more in a molecular weight distribution in gel permeation chromatography, and the white ink composition contains a silicone-based surfactant B having a HLB value of 10.5 or less by Griffin method, but not having a maximum peak within a molecular weight range of 3,000 or more within a molecular weight range of 300 or more in a molecular weight distribution in gel permeation chromatography.

14 Claims, 1 Drawing Sheet

(51) Int. Cl.
 *B41J 2/21*  (2006.01)
 *C09D 11/033* (2014.01)
 *C09D 11/037* (2014.01)
 *C09D 11/102* (2014.01)
 *C09D 11/107* (2014.01)
 *C09D 11/322* (2014.01)
 *C09D 11/38* (2014.01)

(52) U.S. Cl.
 CPC .......... *C09D 11/033* (2013.01); *C09D 11/037* (2013.01); *C09D 11/102* (2013.01); *C09D 11/107* (2013.01); *C09D 11/322* (2013.01); *C09D 11/38* (2013.01)

(58) Field of Classification Search
 CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2012/0262517 A1* | 10/2012 | Takaku | C09D 11/322 524/220 |
| 2013/0029045 A1* | 1/2013 | Koganehira | B41M 5/0011 427/256 |
| 2013/0108842 A1* | 5/2013 | Shiono | B41M 5/0047 347/102 |
| 2014/0104341 A1* | 4/2014 | Yano | B41J 2/2107 106/31.13 |
| 2016/0032122 A1* | 2/2016 | Toda | C09D 11/322 524/123 |
| 2017/0051170 A1* | 2/2017 | Nakagawa | B41J 2/2107 |
| 2017/0335123 A1* | 11/2017 | Nakamura | B41J 2/01 |
| 2017/0368819 A1* | 12/2017 | Kagata | C09D 11/322 |
| 2018/0265723 A1 | 9/2018 | Kagata et al. | |
| 2019/0077978 A1 | 3/2019 | Suzuki et al. | |
| 2019/0283464 A1 | 9/2019 | Matsuzaki | |
| 2019/0292392 A1 | 9/2019 | Okuda et al. | |
| 2020/0172754 A1 | 6/2020 | Okamoto et al. | |
| 2020/0199387 A1 | 6/2020 | Utsugi et al. | |

FOREIGN PATENT DOCUMENTS

| | | |
|---|---|---|
| JP | 2018-154676 A | 10/2018 |
| JP | 2019-019187 A | 2/2019 |
| JP | 2019-167518 A | 10/2019 |
| JP | 2021-021003 A | 2/2021 |

* cited by examiner

INK SET AND RECORDING METHOD

The present application is based on, and claims priority from JP Application Serial Number 2021-133328, filed Aug. 18, 2021, the disclosure of which is hereby incorporated by reference herein in its entirety.

BACKGROUND

1. Technical Field

The present disclosure relates to an ink set and a recording method.

2. Related Art

An ink jet recording method can record high-definition images by a relatively simple apparatus, and is rapidly developed in various fields. Among them, when recording is performed on a transparent recording medium or the like, a method for improving visibility of a color image is investigated, in which a background image serving as a background of a color ink image is formed with a white ink, and the color image is superposed on the background image.

In particular, for the purpose of providing an ink set capable of suppressing positional displacement of an image when recorded on a heated recording medium by using an ink having a high solid content and an ink having a low solid content, JP A-2019-167518 discloses an ink set used for an ink jet recording method including adhering an ink to a heated recoding medium, the ink set including a first ink composition and a second ink composition. The first ink composition and the second ink composition are each an aqueous ink jet ink composition containing a solid content, which contains a coloring material, and an organic solvent. The solid content in the first ink composition is higher by 5% by mass or more than that in the second ink composition, and the organic solvent content in the second ink composition is higher by 7% by mass or more than that in the first ink composition.

However, an image recorded by using a white ink for a background image and a color ink for a color image is still unsatisfactory in view of poor visibility and density.

SUMMARY

According to an aspect of the present disclosure, an ink set includes a non-white ink composition containing a non-white coloring material, and a white ink composition containing a white coloring material, and the non-white ink composition and the white ink composition are each an aqueous ink jet ink. The non-white ink composition contains a silicone-based surfactant A having a maximum peak within a molecular weight range of 3,000 to 20,000 within a molecular weight range of 300 or more in a molecular weight distribution in gel permeation chromatography, and the white ink composition contains a silicone-based surfactant B having a HLB value of 10.5 or less by the Griffin method, but not having a maximum peak within a molecular weight range of 3,000 or more within a molecular weight range of 300 or more in a molecular weight distribution in gel permeation chromatography.

According to an aspect of the present disclosure, a recording method for recording on a recording medium using the ink set described above, the method including a white ink adhering step of ejecting and adhering a white ink composition from an ink jet head to the recording medium, and a non-white ink adhering step of ejecting and adhering a non-white ink composition from an ink jet head to the recording medium.

DESCRIPTION OF EXEMPLARY EMBODIMENTS

Figure 1:
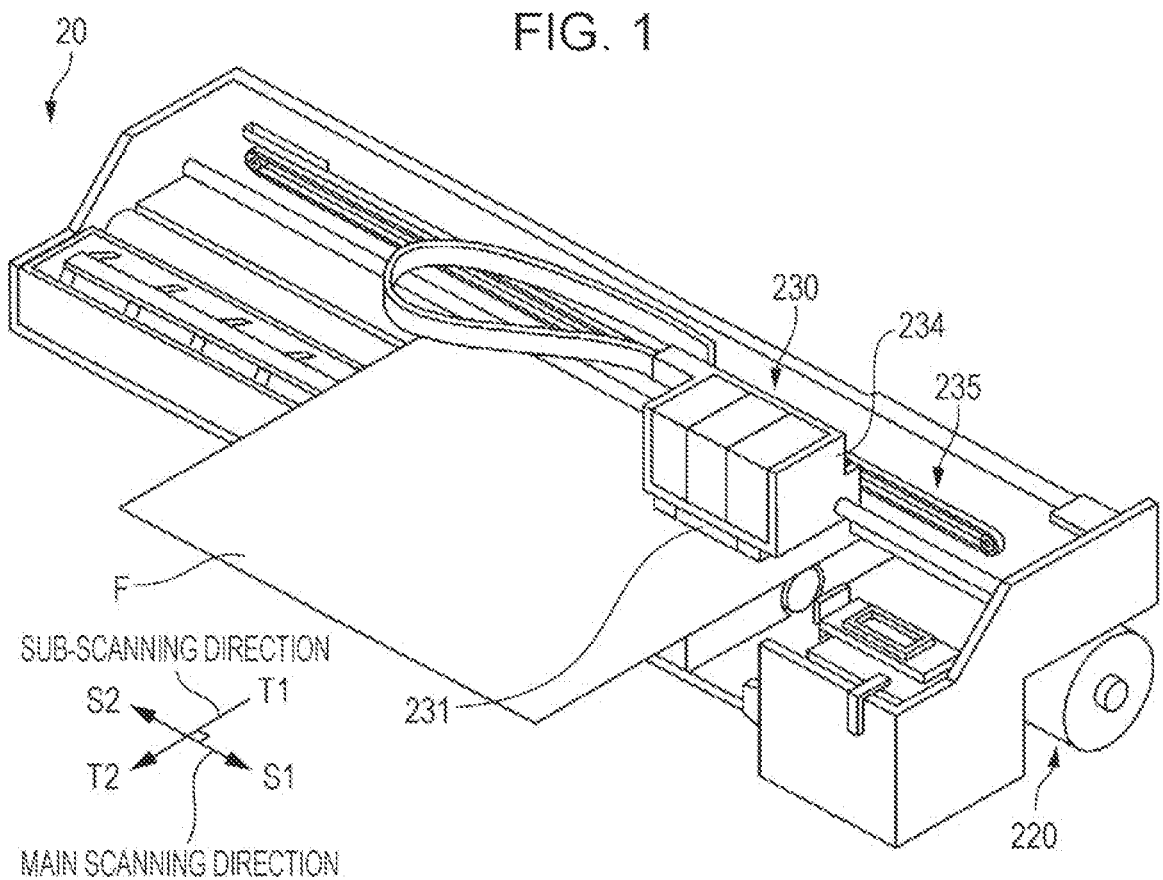
FIG. 1 is a schematic view of an ink jet recording apparatus which can be used in an embodiment of the present disclosure.

An embodiment of the present disclosure (referred to as the "present embodiment" hereinafter) is described in detail below, if required, with reference to the drawings, but the present disclosure is not limited to the embodiment and various modifications can be made within a range where the gist of the present disclosure is not changed. In addition, in the drawings, the same component is denoted by the same reference numeral, and duplicate description is omitted. Also, the vertical and horizontal positional relationships are based on the optional relationships shown in the drawings unless otherwise specified. Further, the dimensional ratio in the drawings is not limited to the ratio shown in the drawings.

1. Ink Set

An ink set according to the present embodiment includes a non-white ink composition containing a non-white coloring material, and a white ink composition containing a white coloring material. The non-white ink composition and the white ink composition are each an aqueous ink jet ink. The non-white ink composition contains a silicone-based surfactant A having a maximum peak within a molecular weight range of 3,000 to 20,000 within a molecular weight range of 300 or more in a molecular weight distribution in gel permeation chromatography, and the white ink composition contains the silicone-based surfactant B having a HLB value of 10.5 or less by the Griffin method, but not having a maximum peak within a molecular weight range of 3,000 or more within a molecular weight range of 300 or more in a molecular weight distribution in gel permeation chromatography.

There is known a method for improving visibility of a color image when recorded on a transparent recording medium or a non-white recording medium, in which a background image is first formed by adhering a white ink composition, and the color image is formed by adhering a non-white ink composition on the background image.

In this case, a white ink preferably used as the white ink for the background image is easily wet and spread on the recording medium and has excellent concealability such that the surface of the recording medium is filled with good fillability. In particular, when recording is performed on a low-absorptive recording medium or a non-absorptive recording medium, a white ink composition having higher concealability and excellent visibility is preferred. However, such a white ink having excellent concealability has the problem of being easily mixed with the non-white ink composition applied thereon. The occurrence of such mixing is found to cause the background image to be mixed with a color image and thus makes the resultant image whitish, thereby degrading the optical density of the image.

However, according to the present embodiment, the silicone-based surfactants having different characteristics are used in the non-white ink composition and the white ink composition use, and thus mixing of the non-white ink composition with the white ink composition is suppressed without degrading the concealability of the white ink composition, and thus an image having excellent visibility and optical density can be obtained.

Also, investigation has been recently performed to obtain an image having excellent concealability and visibility by simultaneously adhering a non-white ink composition and a white ink composition in place of a method of adhering a non-white ink composition on a white ink composition as usual. The ink set according to the present embodiment can form an image with excellent visibility and optical density even by such a simultaneous impact recording method. The configuration of the ink set according to the present embodiment is described in detail below.

The ink set is adapted for recording by simultaneously using the ink compositions provided in the ink set. The ink compositions provided in the ink set may be stored in respective ink vessels or may be stored in respective separate rooms in an integral ink vessel.

1. 1. Non-White Ink Composition

The non-white ink composition is an aqueous ink jet ink composition and contains the non-white coloring material, the predetermined silicone-based surfactant A, and water and, if required, may contain an organic solvent, resin particles, wax, another surfactant, etc.

In the present embodiment, the term "aqueous ink" represents an ink containing at least water as a main solvent component, and the term "ink jet ink" represents an ink ejected from an ink jet head by an ink jet method and used for recording.

1. 1. 1. Non-White Coloring Material

The "non-white coloring material" represents a coloring material, except white coloring materials, among coloring materials. A pigment or dye can be used as the non-white coloring material.

Examples of the pigment include, but are not particularly limited to, carbon black (C. I. Pigment Black 7) such as furnace black, lamp black, acetylene black, channel black, and the like; inorganic pigments such as iron oxide, titanium oxide, and the like; and organic pigments such as a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, an azo-based pigment, and the like. The pigments may be used alone or in combination of two or more.

Examples of a dye include, but are not particularly limited to, an acid dye, a basic dye, a direct dye, a reactive dye, and a disperse dye. These dyes may be used alone or in combination of two or more.

The content of the non-white coloring material relative to the total amount of the non-white ink composition is preferably 0.5% to 10% by mass, more preferably 1.0% to 8.0% by mass, still more preferably 2.0% to 6.0% by mass, and even still more preferably 2.5% to 5.0% by mass. When the content of the non-white coloring material is within the range described above, the ejection stability by the ink jet method tends to be more improved.

1. 1. 2. Surfactant

The non-white ink composition according to the present embodiment contains the predetermined silicone-based surfactant A and, if required, may contain a silicone-based surfactant B described later and another surfactant.

1. 1. 2. 1. Silicone-Based Surfactant A

The silicone-based surfactant A has a maximum peak within a molecular weight range of 3,000 to 20,000 within a molecular weight range of 300 or more in a molecular weight distribution in gel permeation chromatography (GPC). By containing such a silicone-based surfactant A, mixing of the non-white ink composition with the white ink composition is suppressed, and visibility and optical density of an image are more improved.

The maximum peak within a molecular weight range of 300 or more of the silicone-based surfactant A is at a molecular weight of 3,000 to 20,000, preferably at a molecular weight of 4,000 to 15,000, and more preferably at a molecular weight of 5,000 to 10,000. When the maximum peak within a molecular weight range of 300 or more is at a molecular weight of 3,000 or more, there is tendency to suppress mixing of the non-white ink composition with the white ink composition, and to more improve the visibility and optical density of an image. When the maximum peak within a molecular weight range of 300 or more is at a molecular weight of 20,000 or less, the ejection stability tends to be more improved.

The maximum peak within a molecular weight range of 300 or more of the silicone-based surfactant A can be determined by a molecular weight distribution chart measured by GPC, in which "logarithm value (Log M) of molecular weight M" is abscissa, and "differential value (dw/d(Log M) of concentration fraction" is ordinate. Also, the "maximum peak" represents the maximum among the peaks within a molecular weight range of 300 or more. The "maximum peak within a molecular weight range of 300 or more" represents that molecular weight peaks at less than 300 are ignored. That is, the maximum peak may be present at a molecular weight of less than 300, but the maximum peak is in relation to only the molecular weight range of 300 or more.

In the present embodiment, the measurement conditions for GPC measurement are not particularly limited, but, for example, the conditions described in examples can be used, and a molecular weight can be determined by using standard polystyrene.

Examples of the silicone-based surfactant A include, but are not particularly limited to, polysiloxane-based compounds such as dimethylsiloxane, methylphenylsiloxane, diphenylsiloxane, and the like. These polysiloxane-based compounds may be modified organosiloxane having a terminal or side chain group modified with a polyether group or the like. These silicone-based surfactants A may be used alone or in combination of two or more.

Among these, the silicone-based surfactant A is preferably modified organosiloxane and more preferably polyether-modified organosiloxane. Examples of the polyether-modified organosiloxane include modified organosiloxane represented by general formula (1) in which a terminal is modified with a polyether group, and modified organosiloxane represented by general formula (3) in which a side chain is modified with a polyether group. Using such a silicone-based surfactant A more suppresses mixing of the non-white ink composition with the white ink composition. There is thus a tendency that an image of the non-white ink composition can be prevented from being made whitish by mixing with the white ink composition, and the density of the image of the non-white ink composition is increased, thereby more improving the optical density. In particular, when the white ink composition contains the silicone-based surfactant B described later, mixing of the non-white ink composition with the white ink composition can be suppressed even when the non-white ink composition is more easily mixed with the white ink composition. The silicone-based surfactant A has a relatively high molecular weight and is supposed to be capable of suppressing mixing of the non-white ink composition with the white ink composition. However, the reason is not limited to this, and the silicone-based surfactant A is preferred also in view of suppressing aggregation unevenness of an image.

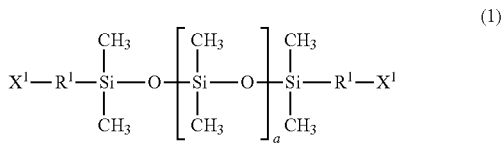

(1)

In the formula, $R^1$ each independently represent an alkylene group having 1 to 6 carbon atoms or a single bond, $X^1$ each independently represent a polyether group represented by general formula (2), and a represents an integer of 10 to 80.

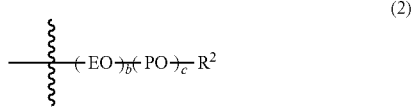

(2)

In the formula, $R^2$ represents a hydrogen atom, an alkyl group having 1 to 6 carbon atoms or a (meth)acryl group, EO represents an ethylene oxide group, PO represents a propylene oxide group, EO and Po are in no particular order, b is an integer of 1 or more, c is an integer of 0 or more, and (b+c) is an integer of 1 or more.

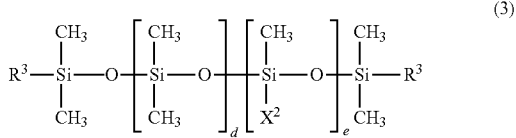

(3)

In the formula, $R^3$ each independently represent an alkyl group having 1 to 6 carbon atoms, $X^2$ each independently represent a polyether group represented by general formula (4), d and e are each an integer of 1 or more, and (d+e) is an integer of 2 to 50.

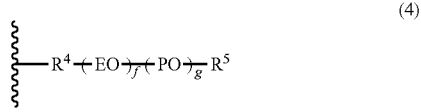

(4)

In the formula, $R^4$ represents an alkylene group having 1 to 6 carbon atoms or a single bond, $R^5$ represents a hydrogen atom or an alkyl group having 1 to 6 carbon atoms, EO represents an ethylene oxide group, PO represents a propylene oxide group, EO and PO are in no particular order, f is an integer of 1 or more, g is an integer of 0 or more, and (f+g) is an integer of 1 or more.

Examples of an alkylene group having 1 to 6 carbon atoms represented by $R^1$, $R^3$, and $R^4$ include, but are not particularly limited to, a methylene group, an ethylene group, a propylene group, a butylene group, a pentylene group, a hexylene group, and the like. $R^1$ and $R^4$ are each preferably an alkylene group having 1 to 6 carbon atoms.

Examples of an alkyl group having 1 to 6 carbon atoms represented by $R^2$ and $R^5$ include, but are not particularly limited to, a methyl group, an ethyl group, a n-propyl group, an isopropyl group, a n-butyl group, an isobutyl group, a sec-butyl group, a tert-butyl group, a n-pentyl group, a neopentyl group, a n-hexyl group, and the like.

$R^1$ and $R^4$ may be each a single bond. The single bond represents that an atom at the right side and an atom at the lift side of each of $R^1$ and $R^4$ are directly bonded to each other through a single bond.

In the general formulae (1) and (2), a is an integer of 10 to 80, preferably an integer of 20 to 70, and more preferably an integer of 30 to 60. In addition, b is an integer of 1 or more, preferably 2 to 30, and more preferably 5 to 20. Further, c is an integer of 0 or more, preferably 0 to 30, and more preferably 0 to 20. Also, (b+c) is an integer of 1 or more, preferably 1 to 60, more preferably 2 to 40, and still more preferably 5 to 20.

In the general formulae (3) and (4), d and e are each an integer of 1 or more, preferably 5 to 40, and more preferably 10 to 20. Also, (d+e) is an integer of 2 to 50, preferably 5 to 40, and more preferably 10 to 30. In addition, f is an integer of 1 or more, preferably 2 to 30, and more preferably 5 to 20. Further, g is an integer of 0 or more, preferably 0 to 30, and more preferably 0 to 20. Also, (f+g) is an integer of 1 or more, preferably 1 to 60, more preferably 2 to 40, and still more preferably 5 to 20.

The content of the silicone-based surfactant A relative to the total amount of the non-white ink composition is preferably 0.1% to 5.0% by mass, more preferably 0.3% to 3.0% by mass, and still more preferably 0.6% to 1.5% by mass. When the content of the silicone-based surfactant A is within the range descried above, there is a tendency to more suppress mixing of the non-white ink composition with the white ink composition and more improve the visibility and optical density of an image.

In particular, the silicone-based surfactant A is preferably the modified organosiloxane having a terminal modified with a polyether group represented by the general formula (1) because of more excellent visibility and aggregation unevenness suppression of an image.

1. 1. 2. 2. Silicone-Based Surfactant B

The non-white ink composition may further contain, preferably contains, the silicone-based surfactant B described later. This tends to more improve the visibility of an image. The silicone-based surfactant B contained in the non-white ink composition may be the same as or different from the silicone-based surfactant B contained in the white ink composition.

The content of the silicone-based surfactant B relative to the total amount of the non-white ink composition is preferably 0.1% to 5.0% by mass, more preferably 0.3% to 3.0% by mass, and still more preferably 0.6% to 1.5% by mass. When the content of the silicone-based surfactant B is within the range descried above, the visibility of an image tends to be more improved.

1. 1. 2. 3. Other Surfactant

Examples of the other surfactant include, but are not particularly limited to, an acetylene glycol-based surfactant, a fluorine-based surfactant, and other silicone-based surfactants other than the silicone-based surfactants A and B described above. The other surfactants may be used alone or in combination of two or more.

Examples of the acetylene glycol-based surfactant include, but are not particularly limited to, 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol.

Examples of the fluorine-based surfactant include, but are not particularly limited to, perfluoroalkylsulfonate salts, perfluoroalkylcarboxylate salts, perfluoroalkylphosphate esters, perfluoroalkyl ethylene oxide adducts, perfluoroalkylbetaine, and perfluoroalkylamine oxide compounds.

The other silicone-based surfactant is not particularly limited as long as it does not satisfy the requirements of the silicone-based surfactants A and B. Examples thereof include a polysiloxane-based compound, a polyether-modified organosiloxane, and the like.

The content of the other surfactant relative to the total amount of the non-white ink composition is preferably 0.1% to 5.0% by mass, more preferably 0.3% to 3.0% by mass, and still more preferably 0.6% to 1.5% by mass.

1. 1. 3. Water

The content of water relative to the total amount of the non-white ink composition is preferably 40% to 98% by mass, more preferably 50% to 90% by mass, still more preferably 55% to 85% by mass, even still more preferably 60% to 80% by mass, and even still more further preferably 65% to 75% by mass.

1. 1. 4. Organic Solvent

Examples of the organic solvent include, but are not particularly limited to as long as it is a water-soluble organic solvent, polyols. The polyols are alkane polyols or condensate produced by intermolecular condensation of hydroxyl groups of alkane polyols, and have two or more hydroxyl groups in their molecules.

Examples of the polyols include triol or higher polyols, such as glycerin and the like.

Specific examples of the polyols include glycols such as ethylene glycol, diethylene glycol, triethylene glycol, propylene glycol, dipropylene glycol, 1,3-propanediol, 1,2-butanediol, 1,3-butanediol, 1,2-pentanediol, 1,2-hdiexaneol, 1,4-butanediol, 1,5-pentanediol, 1,6-hexanediol, and the like. The glycols have two or more hydroxyl groups in their molecules. The glycols preferably have 2 to 10 carbon atoms, more preferably have 3 to 6 carbon atoms, and still more preferably have 3 to 4 carbon atoms.

Other examples of the organic solvent include glycol ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, triethylene glycol monobutyl ether and the like; nitrogen-containing solvents such as 2-pyrroldone, N-methyl-2-pyrrolidone, N-ethyl-2-pyrrolidone, and the like; alcohols such as methanol, ethanol, n-propyl alcohol, iso-propyl alcohol, n-butanol, 2-butanol, tert-butanol, iso-butanol, n-pentanol, 2-pentanol, 3-pentanol, tert-pentanol, and the like; and the like. Also, the nitrogen-containing solvents include amides. Examples of amides include cyclic amides, noncyclic amides, and the like. Examples of cyclic amides include lactams, and examples of noncyclic amides include N,N-dialkylamide and the like, for example, N,N-dialkylalkoxyamide. The organic solvents may be used alone or in combination of two or more.

Among these, polyols are preferred, and glycols are more preferred. The use of such an organic solvent tends to more suppress mixing of the non-white ink composition with the white ink composition and more improve the visibility and optical density of an image.

The content of the organic solvent relative to the total amount of the non-white ink composition is preferably 5% to 30% by mass, more preferably 10% to 30% by mass, and still more preferably 15% to 25% by mass. When the content of the organic solvent is within the range described above, there is a tendency to more suppress mixing of the non-white ink composition with the white ink composition and more improve the visibility and optical density of an image and ejection stability.

The non-white ink composition preferably contains an organic solvent having a standard boiling point of 280° C. or less and more preferably contains an organic solvent having a standard boiling point of 170° C. to 250° C. By containing an organic solvent having a standard boiling point of 170° C. to 250° C., there is a tendency to more improve the drying properties, improve the optical density, and more decreases aggregation unevenness.

Also, the non-white ink composition preferably contains an organic solvent having a standard boiling point of less than 200° C. or less. By containing an organic solvent having a standard boiling point of less than 200° C., there is a tendency to more improve the drying properties, improve the optical density, and more decrease aggregation unevenness.

The content of the organic solvent having a standard boiling point of less than 200° C. relative to 100% by mass of the organic solvent contained in the non-white ink composition is preferably 30% to 80% by mass, more preferably 40% to 75% by mass, and still more preferably 50% to 70% by mass. When the content of the organic solvent having a standard boiling point of less than 200° C. is within the range described above, there is a tendency to more improve the drying properties, improve the optical density, and more decrease aggregation unevenness. Also, the ejection stability is excellent.

The content of a water-soluble organic solvent, such as polyols, having a standard boiling point of over 280° C. relative to the total mass of the ink composition is preferably 1% by mass or less and more preferably 0.5% by mass or less, and may be 0% by mass. When the content of the water-soluble organic solvent having a standard boiling point of over 280° C. is within the range described above, there is a tendency to improve the optical density, more decrease aggregation unevenness, and improve abrasion resistance. Further, the content of the water-soluble organic solvent having a standard boiling point of over 280° C. is more preferably put into the range described above.

1. 1. 5. Resin Particles

The non-white ink composition may further contain resin particles. The use of the resin particles tends to more improve the abrasion resistance. Examples of the resin particles include, but are not particular limited to, resin particles composed of a urethane-based resin, acrylic resin (including a styrene-acrylic resin), a fluorene-based resin, a polyolefin-based resin, a rosin-modified resin, a terpen-based resin, a polyester-based resin, a polyamide-based resin, an epoxy-based resin, a vinyl chloride-based resin, vinyl chloride-vinyl acetate copolymer, an ethylene-vinyl acetate-based resin, and the like. The resin particles may be in an emulsion form.

Among these, acrylic resin particles, urethane-based resin particles, or polyester-based resin particles are used. The use of such resin particles tends to more improve abrasion resistance. The resin particles are often handled in an emulsion form, but may be in a powder form. These types of resin particles may be used alone or in combination of two or more.

The urethane-based resin is a general term of resins having a urethane bond. A urethane-based resin having a bond other than a urethane bond in its main chain may be used as the urethane-based resin, and examples thereof include a polyether-type urethane resin having an ether bond in its main chain, a polyester-type urethane resin having an ester bond in its main chain, a polycarbonate-type urethane resin having a carbonate bond in its main chain, and the like.

The acrylic resin is a general term of polymers produced by polymerizing at least an acrylic monomer such as (meth) acrylic acid, (meth)acrylate ester or the like as one component, and examples thereof include a resin produced from an acrylic monomer, a copolymer of an acrylic monomer and another monomer, and the like. For example, an acrylic-vinyl-based resin, which a copolymer of an acrylic monomer and a vinyl-based monomer, or the like can be used. Further, for example, styrene and the like can be used as the vinyl-based monomer. Also, acrylamide, acrylonitrile, and the like can be used as the acrylic monomer.

Among these, the acrylic resin is preferred, and the styrene-acrylic resin is more preferred. Examples of the styrene-acrylic resin include, but are not particularly limited to, a styrene-acrylic acid copolymer, a styrene-methacrylic acid copolymer, a styrene-methacrylic acid-acrylate ester copolymer, a styrene-α-methylstyrene-acrylic acid copolymer, a styrene-α-methylstyrene-acrylic acid-acrylate ester copolymer, and the like. The use of such a resin tends to more improve the abrasion resistance of the resultant recorded matter.

The polyolefin-based resin has a structural skeleton having an olefin such as ethylene, propylene, butylene, or the like, and a known resin can be properly selected and used.

The content of the resin particles relative to the total mass of the non-white ink composition is preferably 0.5% to 6.0% by mass, more preferably 1.0% to 5.0% by mass, and still more preferably 2.0% to 4.0% by mass. When the content of the resin particles is within the range described above, there is a tendency to more improve the abrasion resistance.

1. 1. 6. Wax

Examples of the wax include, but are not particularly not limited to, hydrocarbon wax, and ester wax which is a condensate of fatty acid and monohydric alcohol or polyhydric alcohol. Examples of hydrocarbon wax include, but are not particularly limited to, paraffin wax, and polyolefin wax such as polyethylene wax and polypropylene wax, and the like. These waxes may be used alone or in combination of two or more. Among these waxes, from the viewpoint of improving the abrasion resistance, hydrocarbon wax is preferred, polyolefin wax is more preferred, and polyethylene wax is still more preferred.

The wax may be in, for example, an emulsion state in which wax particles are dispersed in water.

The content of the wax relative to the total mass of the non-white ink composition is preferably 0.1% to 5.0% by mass, more preferably 0.3% to 3.0% by mass, and still more preferably 0.6% to 1.5% by mass. This tends to more improve the abrasion resistance of the resultant recorded matter.

1. 1. 7. Other Component

Various additives, such as a solubilizer, a viscosity modifier, a pH adjuster, an antioxidant, a preservative, an anti-mold agent, an anticorrosive agent, a chelating agent, etc., can be added to the non-white ink composition according to the present embodiment.

1. 2. White Ink Composition

The white ink composition is an aqueous ink jet ink composition and contains a white coloring material, the predetermined silicone-based surfactant B, and water and, if required, may contain an organic solvent, resin particles, wax, other components, etc. Each of the components is described below. With respect to components other than the white coloring material and the silicone-based surfactant B in the white ink composition, besides the matters described later, the types and contents of components, which may be contained, may be, preferably, the same as those described above for the non-white ink composition.

1. 2. 1. White Coloring Material

Examples of the white coloring material include, but are not particularly limited to, white inorganic coloring materials such as C. I. Pigment White 6, 18, and 21, titanium oxide, zinc oxide, zinc sulfide, antimony oxide, magnesium oxide, and zirconium oxide. Besides the white inorganic coloring materials, white organic coloring materials, such as white hollow resin particles, polymer particles, and the like, can also be used.

The content of the white coloring material relative to the total amount of the white ink composition is preferably 2% to 20% by mass, more preferably 3% to 17% by mass, still more preferably 5% to 15% by mass, and even still more preferably 7.5% to 12.5% by mass. When the content of the white coloring material is within the range described above, there is a tendency that an image having high concealability can be obtained, and ejection stability by an ink jet method is more improved.

1. 2. 2. Surfactant

The white ink composition according to the present embodiment contains the predetermined silicone-based surfactant B and, if required, may contain the silicone-based surfactant A and other surfactant described above.

1. 2. 2. 1. Silicone-Based Surfactant B

The silicone-based surfactant B has a HLB value (Hydrophile-Lipophile Balance) of 10.5 or less by the Griffin method, but not having a maximum peak at a molecular weight of 3,000 or more within a molecular weight range of 300 or more in a molecular weight distribution in gel permeation chromatography. By containing the silicone-based surfactant B, the wettability of the white ink composition to a recording medium can be improved, and concealability can be improved. Therefore, the image obtained by using the white ink composition for a background image is more improved in terms of image visibility and optical density.

The silicone-based surfactant B does not have a maximum peak at a molecular weight of 3,000 or more within a molecular weight range of 300 or more, and specifically, it does not have a maximum peak within a molecular weight range of 300 or more, or even when it has a maximum peak within a molecular weight range of 300 or more, the maximum peak is at a molecular weight of less than 3,000. The use of the silicone-based surfactant B satisfying the molecular weight conditions more improves the wettability of the white ink composition to a recording medium and allows the surface of the recording medium to be sufficiently covered with the white ink composition, thereby more improving the visibility of an image. In particular, when the recording medium is a low-absorptive recording medium or a non-absorptive recording medium, wettability tends to be more improved. On the other hand, mixing of the non-white ink composition with the white ink composition tends to more easily occur. The silicone-based surfactant B also has excellent abrasion resistance and is thus preferred.

The maximum peak in a molecular weight range of 300 or more of the silicone-based surfactant B can be measured by the same method as for the silicone-based surfactant A.

In addition, the HLB value of the silicone-based surfactant B is 10.5 or less, preferably 2.0 to 10.3, more preferably 3.0 to 10.1, and still more preferably 4.0 to 10.0. With the HLB value of 10.5 or less, the wettability of the white ink composition to the recording medium is more improved, and the visibility of an image is more improved. In addition, with the HLB value of 2.0 or more, there is a tendency to more improve the optical density of the resultant image and more decrease aggregation unevenness.

The HLB value is a value indicating the degree of affinity of the surfactant for water and oil, and with the HLB value within the range described above, wettability of ink droplets can be improved when impacted on a hardly-absorptive substrate with high hydrophobicity. The improvement in wettability tends to suppress voids and color mixing bleeding on a substrate and thus more improve the visibility of an image. The HLB value is defined and calculated by the Griffin method.

Examples of the silicone-based surfactant B include, but are not particularly limited to, polysiloxane-based compounds such as dimethylsiloxane, methylphenylsiloxane, diphenylsiloxane, and the like. In particular, examples of the polysiloxane-based compounds include modified organosiloxane having a terminal or side chain group modified with a polyether group or the like. These silicone-based surfactants B may be used alone or in combination of two or more.

The silicone-based surfactant B is, for example, a surfactant in which a in the general formula (1) is smaller than that of the silicone-based surfactant A contained in the non-white ink composition, or a surfactant in which (d+e) in the general formula (3) is smaller than that of the silicone-based surfactant A contained in the non-white ink composition. The silicone-based surfactant B has a molecular weight relatively smaller than that of the silicone-based surfactant A contained in the non-white ink composition.

The content of the silicone-based surfactant B relative to the total amount of the white ink composition is preferably 0.1% to 5.0% by mass, more preferably 0.3% to 3.0% by mass, and still more preferably 0.6% to 1.5% by mass. When the content of the silicone-based surfactant B is 0.1% by mass or more, there is a tendency to more improve the wettability of the white ink composition to a recording medium and more improve the visibility of an image. When the content of the silicone-based surfactant B is 5.0% by mass or less, there is a tendency to more suppress mixing of the non-white ink composition with the white ink composition and more improve the visibility and optical density of an image.

1. 2. 2. 2. Silicone-Based Surfactant A

The white ink composition may further contain or not contain the silicone-based surfactant A. When contained, the silicone-based surfactant A contained in the white ink composition may be the same as or different from the silicone-based surfactant A contained in the non-white ink composition.

The content of the silicone-based surfactant A relative to the total amount of the white ink composition is preferably 5.0% by mass or less, more preferably 3.0% by mass or less, and still more preferably 1.5% by mass or less. Further, the content is preferably 1% by mass or less, more preferably 0.5% by mass or less, still more preferably 0.2% by mass or less, even still more preferably 0.1% by mass or less, and even still more preferably 0.05% by mass or less. The lower limit is 0% by mass or more and preferably 0% by mass. The content of the silicone-based surfactant A is preferably within the range described above because of the more excellent optical density of an image.

In another aspect, when the silicone-based surfactant A is contained, the content is preferably 0.1% to 5.0% by mass, more preferably 0.3% to 3.0% by mass, and still more preferably 0.6% to 1.5% by mass.

When the silicone-based surfactant A is contained or not contained, the content of the silicone-based surfactant A in the white ink composition is preferably lower than that of the silicone-based surfactant B, more preferably lower by 0.5% by mass or more, still more preferably lower by 1.0% by mass or more, and even still more preferably lower by 1.0% to 5.0% by mass. This tends to more improve the visibility and optical density of an image.

1. 2. 2. 3. Other Surfactant

The white ink composition may further contain the other surfactant described above. The content of the other surfactant relative to the total amount of the white ink composition is preferably 0.1% to 5.0% by mass, more preferably 0.3% to 3.0% by mass, and still more preferably 0.6% to 1.5% by mass.

1. 2. 3. Water

The content of water relative to the total amount of the white ink composition is preferably 55% to 85% by mass, more preferably 60% to 80% by mass, and still more preferably 65% to 75% by mass.

1. 2. 4. Organic Solvent

Examples of the organic solvent include the same organic solvents as those exemplified for the non-white ink composition. The organic solvent used in the white ink composition may be the same as or different from the organic solvent used in the non-white ink composition.

Among these, glycols and polyols are preferred, and glycols are more preferred. The use of such an organic solvent tends to more suppress mixing of the non-white ink composition with the white ink composition and more improve the visibility and optical density of an image.

The content of the organic solvent relative to the total amount of the white ink composition is preferably 5% to 35% by mass, more preferably 10% to 30% by mass, and still more preferably 15% to 25% by mass. When the content of the organic solvent is within the range described above, there is a tendency to more suppress mixing of the non-white ink composition with the white ink composition and more improve the visibility and optical density of an image.

The white ink composition preferably contains an organic solvent having a standard boiling point of 170° C. to 250° C. By containing an organic solvent having a standard boiling point of 170° C. to 250° C., there is a tendency to more improve the drying properties, improve the optical density, and more decreases aggregation unevenness.

Also, the white ink composition preferably contains an organic solvent having a standard boiling point of less than 200° C. By containing an organic solvent having a standard boiling point of less than 200° C., there is a tendency to more improve the drying properties, improve the optical density, and more decreases aggregation unevenness.

The content of the organic solvent having a standard boiling point of less than 200° C. relative to 100% by mass of the organic solvent contained in the white ink composition is preferably 30% to 80% by mass, more preferably 40% to 75% by mass, and still more preferably 50% to 70% by mass. When the content of the organic solvent having a standard boiling point of less than 200° C. is within the range described above, there is a tendency to more improve the drying properties, improve the optical density, and more decrease aggregation unevenness.

The content of a water-soluble organic solvent having a standard boiling point of over 280° C. relative to the total mass of the ink composition is preferably 1% by mass or less and more preferably 0.5% by mass or less, and may be 0% by mass. When the content of the water-soluble organic solvent having a standard boiling point of over 280° C. is within the range described above, there is a tendency to improve the optical density, more decrease aggregation unevenness, and improve abrasion resistance.

1. 2. 5. Resin Particles

The white ink composition may further contain resin particles. The use of the resin particles tends to more improve the abrasion resistance. Examples of the resin particles include the same ones as those exemplified for the non-white ink composition. The resin particles used in the white ink composition may be the same as or different from the resin particles used in the non-white ink composition.

The content of the resin particles relative to the total mass of the white ink composition is preferably 0.5% to 6.0% by mass, more preferably 1.0% to 5.0% by mass, and still more preferably 2.0% to 4.0% by mass. When the content of the resin particles is within the range described above, there is a tendency to more improve the abrasion resistance.

1. 2. 6. Wax

The white ink composition may further contain wax. The use of wax tends to more improve abrasion resistance. Examples of the wax include the same ones as those exemplified for the non-white ink composition. The wax used in the white ink composition may be the same as or different from the wax used in the non-white ink composition.

The content of the wax relative to the total amount of the white ink composition is preferably 0.1% to 5.0% by mass, more preferably 0.3% to 3.0% by mass, and still more preferably 0.6% to 1.5% by mass. This tends to more improve the abrasion resistance of the resultant recorded matter.

1. 2. 7. Other Component

Various additives, such as a solubilizer, a viscosity modifier, a pH adjuster, an antioxidant, a preservative, an antimold agent, an anticorrosive agent, a chelating agent, etc., can be added to the white ink composition according to the present embodiment.

1. 3. Method for Preparing Ink Composition

A method for preparing the non-white ink composition and the white ink composition is not particularly limited, but is, for example, a method including mixing the components described above and sufficiently stirring the mixture so that the components are uniformly mixed.

2. Recording Method

A recording method according to the present embodiment is a recording method for recording on a recording medium by using the ink set described above. The method includes a white ink adhering step of ejecting and adhering a white ink composition from an ink jet head to a recording medium, a non-white ink adhering step of ejecting and adhering a non-white ink composition from an ink jet head to a recording medium, and, if required, may include a drying step and other steps.

The recording method according to the present embodiment has, for example, two modes described later for a method for adhering the white ink composition and the non-white ink composition.

In the present embodiment, when no particular distinction is made between a white ink jet head and a non-white ink jet head, they are simply referred to as an "ink jet head". Similarly, when no particular distinction is made between the white ink composition and the non-white ink composition, they are simply referred to as the "ink composition".

In addition, the term "main scanning" represents an operation of ejecting and adhering the ink composition from the ink jet head while moving the relative position of the ink jet head to the recording medium. The ink jet head can be mounted on, for example, a carriage. The ink jet head may be moved by moving the carriage, that is, also in this case, the ink jet head is regarded as moved.

In addition, the "main scanning direction" represents the movement direction of the relative position of the ink jet head to the recording medium, that is, the width direction of the recording medium. In addition, the "main scanning" represents the movement of the relative position of the ink jet head to the recording medium, and the ink jet head may be moved relatively to the recording medium, or the recording medium may be moved relatively to the ink jet head. The movement direction of such a relative position is the main scanning direction. The movement of the relative position of the ink jet head to the recording medium can also be represented by the movement of the relative position of the recording medium to the ink jet head. That is, the relative position between the ink jet head and the recording medium is moved.

On the other hand, the term "sub-scanning" represents an operation of moving the relative position between the ink jet head and the recording medium in the sub-scanning direction. The "sub-scanning direction" represents the direction perpendicular to the main scanning direction.

For example, the ink composition is adhered by main scanning to a certain region of the recording medium, and, for example, the recording medium is slightly moved by sub-scanning. Next, the ink composition is further adhered by main scanning so as to be adjacent to or partially overlapped with the ink composition adhered in advance. This operation is repeated to enable recording. Also, the "sub-scanning" represents the movement of the relative position of the ink jet head to the recording medium, and the ink jet head may be moved relatively to the recording medium or the recording medium may be moved relative to the ink jet head. The movement direction of such a relative position is the sub-scanning direction.

Recording may be performed by a plurality of times of each of main scanning and sub-scanning. For example, main scanning and sub-scanning may be alternately repeated.

2. 1. First Adhesion Mode

The first adhesion mode is a mode in which a non-white ink layer and a white ink layer are laminated by adhering in order the white ink composition and the non-white ink composition. This is also referred to as "lamination printing" or "lamination impact". In this mode, in the white ink adhering step and the non-white ink adhering step, a white ink image formed by the white ink composition and a non-white ink image formed by the non-white ink composition are formed to be superposed on a recording medium.

In the first adhesion mode, the adhesion order is not limited as long as the white ink composition and the non-white ink composition are adhered by different main scanning operations. The white ink composition may be first adhered to the recording medium, and then the non-white ink composition may be adhered to a layer of the white ink composition. Conversely, the non-white ink composition may be first adhered to the recording medium, and then the white ink composition may be adhered to a layer of the non-white ink composition. The image formed in the former manner becomes an image visible from the side of the recording medium surface to which the ink composition is adhered, and the image formed in the latter manner becomes an image visible from the side of the recording medium surface to which the ink composition is not adhered.

When the first adhesion mode is performed, a layer containing the white ink composition and a layer containing the non-white ink composition can be formed to be laminated by, for example, different main scanning operations of adhering the white ink composition and the non-white ink composition to the same scanning region of the recording medium. Thus, concealability by the layer containing the white ink composition is secured, and thus the color development and visibility of the non-white ink composition formed thereon are more improved, thereby enabling to obtain a high-quality image.

When the white ink composition is first adhered, and the non-white ink composition is adhered thereon, an image visible from the side of the surface, to which the ink is adhered, can be formed. In reverse, when the recording medium is transparent and when the non-white ink composition is first adhered, and the white ink composition is adhered thereon, an image visible from the side of the surface, to which the ink is not adhered, can be formed.

In the first adhesion mode, different main scanning operations may be each performed a plurality of times to adhere the white ink composition and the non-white ink composition to the same scanning region. For example, it is considered that the white ink composition is recorded in 4 passes, and then the non-white ink composition is recorded in 4 passes.

2. 2. Second Adhesion Mode

The second adhesion mode is a mode of simultaneously adhering the white ink composition and the non-white ink composition and is also referred to as "simultaneous printing" or "simultaneous impact". In this mode, in the white ink adhering step and the non-white ink adhering step, the main scanning operation is performed a plurality of times to eject and adhere the ink composition to the recording medium while moving the relative position of the ink jet head to the recording medium. In the main scanning, the white ink composition and the non-white ink composition are adhered to the same scanning region of the recording medium by the same main scanning operation.

In this mode, ink composition layers: a layer of the white ink composition and a layer of the non-white ink composition, need not be laminated, and thus the recording speed can be improved. In addition, when the recording medium is transparent, the resultant image is seen as the same image from both the surface and back sides. Therefore, when a recorded matter is used by attaching to a window, glass, or the like, an image visible from both the surface and back sides can be obtained.

When the second adhesion mode is performed, for example, the white ink composition and the non-white ink composition are adhered to the same scanning region of the recording medium by the same main scanning operation, forming a layer containing the white ink composition and the non-white ink composition. That is, the white ink adhering step and the non-white ink adhering step are performed by the same main scanning operation.

In the second adhesion mode, main scanning may be performed a plurality of times for the same scanning region to adhere the white ink composition and the non-white ink composition to the scanning region. That is, preferably, a layer containing the white ink composition and the non-white ink composition is adhered to a region of the recording medium by a main scanning operation, and then a layer containing the white ink composition and the non-white ink composition is further adhered to be superposed thereon by another main scanning operation. In this case, the main scanning operation of adhering the white ink composition and the non-white ink composition is performed a plurality of times for the same region. There is thus a tendency that with increasing number of scanning times, the ink can be divided and adhered a plurality of times (a plurality of passes) to a desired region, and the image quality of the resultant recorded matter is more improved.

In recording on a desired region, the number of passages of the ink jet head through the region is referred to as the "number of passes". For example, when the main scanning is performed 4 times in the same region to adhere the white ink composition and the non-white ink composition, the number of passes is referred to as "4 passes". For example, in an example shown in FIG. 1, when the length of one time of sub-scanning in the sub-scanning direction is one fourth of the length in the sub-scanning direction of a nozzle line in which the nozzles are arranged in the sub-scanning direction of the ink jet head, main scanning is performed 4 times in the same portion (same scanning region) of a rectangular scanning region which has the length of one sub-scanning in the sub-scanning direction and extends in the main scanning direction. In view of this, the number of scanning times is referred to as the "scanning number" or "number of passes". The number of scanning times is 1 or more, preferably 2 or more, more preferably 3 or more, still more preferably 4 or more, and particularly preferably 8 or more. In view of excellent image quality, the number of scanning times is preferably within or more than the range described above. The upper limit is not limited, but is preferably 24 or less, more preferably 12 or less, more preferably 8 or less, and still more preferably 4 or less. In view of the high recording rate, the upper limit is preferably within or less than the range described above. The number of scanning times is provided for each of ink types.

In addition, in the second adhesion mode, a layer containing the white ink composition may be formed by a main scanning operation different from the main scanning of forming a layer containing the white ink composition and the non-white ink composition, and a layer containing the white ink composition and the non-white ink composition and another layer containing the white ink composition may be formed to be laminated. Therefore, an image having higher color development can be formed by forming the layer containing the white ink composition. The layer containing the white ink composition may be formed before or after the formation of the layer containing the white ink composition and the non-white ink composition. When the white ink layer is formed before that formation, a recorded matter is used by seeing an image from the recording surface side of the recording medium. When the white ink layer is formed after that formation, a recorded matter is used by seeing an image from the side opposite to the recording surface side of the recording medium.

2. 3. White Ink Adhering Step

The white ink adhering step is a step of ejecting and adhering the white ink composition from the ink jet head to the recording medium. The ink composition can be ejected by the ink jet system using a known ink jet recording apparatus. Usable examples of an ejection method include, but are not particularly limited to, a piezo system, a system of ejecting an ink as bubbles generated by heating the ink, and the like.

The adhesion amount of the white ink composition per unit area of the region (also referred to as the "adhesion region of the white ink composition" hereinafter) on the recording medium, to which the white ink composition is adhered, is preferably 2.0 to 20 mg/inch$^2$ and more preferably 3.0 to 10 mg/inch$^2$. The area for determining the adhesion amount is, for example, an area of about 2×2 mm.

2. 4. Non-White Ink Adhering Step

The non-white ink adhering step is a step of ejecting and adhering the non-white ink composition from the ink jet head to the recording medium.

The adhesion amount of the non-white ink composition per unit area of the region (also referred to as the "adhesion region of the non-white ink composition" hereinafter) on the recording medium, to which the non-white ink composition is adhered, is preferably 2.0 to 20 mg/inch$^2$ and more preferably 3.0 to 10 mg/inch$^2$. When the adhesion amount of the non-white ink composition is within the range described above, the resultant recorded matter tends to have more excellent image quality and abrasion resistance.

The adhesion amount of the non-white ink composition is such that in the adhesion region where the white ink composition and the non-white ink composition are adhered, the ratio (adhesion amount of white ink composition/adhesion amount of non-white ink composition) of the adhesion amount of white ink composition adhered to the adhesion amount of the non-white ink composition is preferably 2 or less and more preferably 0.1 to 2. In the first adhesion mode, the adhesion amount ratio is more preferably 0.5 to 1.5 and still more preferably 0.8 to 1.3. In the second adhesion mode, the adhesion amount ratio is more preferably 0.2 to 1 and still more preferably 0.3 to 0.7.

The adhesion amount of each of the ink compositions and the adhesion amount ratio may be per unit area of the adhesion region on the recording medium to which the white ink composition and the non-white ink composition are adhered. In this case, a region having the maximum adhesion amount of the non-white ink composition may be used.

2. 5. Number of Passes

Each of the white ink adhering step and the non-white ink adhering step includes a step of performing main scanning a plurality of times for the same scanning region on the recording medium to eject and adhere the ink composition to the recording medium while moving the relative position of the ink jet head to the recording medium. In this case, the number of main scanning times, that is, the number of passes, for the same scanning region is preferably 8 or less and more preferably 1 to 8 or less. With the number of passes within the range described above, productivity tends to be more improved.

2. 6. Primary Drying Step

The recording method according to the present embodiment may include a primary drying step of drying, by a drying mechanism, the white ink composition and non-white ink composition adhered to the recording medium. The primary drying step is a step of early drying the ink by heating the recording medium before the ejection step or by heating or air blowing to the recording medium during the ejection step or early after the adhesion of the ink to the recording medium. The primary drying step is a step for drying at least a portion of the solvent component of the ink adhered to the recording medium to a degree that decreases at least the ink fluidity. The primary drying step may be performed so that the ink is adhered to the recording medium or may be performed early after the adhesion so as to promote drying. The primary drying step is preferably performed to start drying of the ink droplets impacted on the recording medium at latest within 0.5 seconds from the impacting of the ink droplets. Examples of a drying unit (drying mechanism) for drying the recording medium include, but are not particularly limited to, a platen heater, a hot air heater, an IR heater, and the lie, which are provided with a heating mechanism, an air blower and the like, which are not provided with a heating mechanism, and the like.

Examples of the type of the drying mechanism include a conduction type in which the recording medium is heated by heat conduction from a member in contact with the recording medium to the recording medium, a radiation type in which the recording medium is heated by radiating radiant rays, such as IR, to the recording medium, an air blowing type in which wind is blown to the recording medium, and the like. Examples of the air blowing type include a type in which the recording medium is heated by blowing wind with hot air, and a system in which ink drying is accelerated by ordinary-temperature wind without heating. The method not accompanied with heating is preferred because decrease in ejection stability due to drying of the ink in nozzles of the ink jet head can be suppressed. The air blowing type is preferably used in combination with any one of the conduction type and the radiation type. In the combination, the air blowing system may be, or preferably, a method without heating.

In the primary drying step, the surface temperature of the recording medium is preferably 50° C. or less, more preferably 45° C. or less, still more preferably 30° C. to 42° C., and even still more preferably 32° C. to 40° C. When the surface temperature of the recording medium is within the range described above, there is tendency that the drying properties are more improved, mixing of the non-white ink composition with the white ink composition is more suppressed, the visibility and optical density of an image are more improved, and the abrasion resistance of the resultant recorded matter is more improved.

When the air blowing type is used, the air speed near the recording medium is preferably 0.5 to 10 m/s, more preferably 1 to 5 m/s, and still more preferably 2 to 3 m/s. The air temperature is preferably 45° C. or less, more preferably 40° C. or less, still more preferably 32° C. or less, and particularly preferably 20° C. to 27° C.

2. 7. Secondary Drying Step

The secondary drying step is a step of heating the recording medium after the ink adhering step. The secondary drying step is a step of sufficiently heating to a degree which enables the use of the recorded matter after the completion of recording. The secondary drying step is a step for flattening an ink coating film by sufficiently drying the solvent component of the ink and heating the resin or the like contained in the ink. The secondary drying step is preferably started over 0.5 seconds after the ink adhesion to the recording medium. For example, in a certain recording region of the recording medium, the region is preferably started to be heated over 0.5 seconds after the whole completion of ink adhesion. In this case, the surface temperature of a low-absorptive recording medium or non-absorptive recording medium is preferably 50° C. to 100°

C., more preferably 60° C. to 90° C., and still more preferably 70° C. to 80° C. When the surface temperature of the recording medium is within the range described above, the abrasion resistance of the resultant recorded matter tends to be more improved. Usable examples of a secondary drying mechanism include a conduction type, a radiation type, an air blowing type, and the like.

2. 8. Recording Medium

The recording method according to the present embodiment preferably uses, as the recording medium, a low-absorptive recording medium or a non-absorptive recording medium. The low-absorptive recording medium and non-absorptive recording medium have excellent water resistance and abrasion resistance, while they tend to easily repel a treatment liquid and an aqueous ink composition and also to have low adhesion of the ink composition. Therefore, the present disclosure is particularly useful for such a recording medium. Other examples of the recording medium include an absorptive recording medium. The absorptive recording medium is a recording medium including an ink-absorptive substrate or including an ink receiving layer having ink absorptivity. Examples of the absorptive recording medium include ink jet paper, plain paper, a fabric, and the like.

Examples of the low-absorptive recording medium include, but are not particularly limited to, coated paper having a surface provided with a coating layer for receiving an oily ink. Examples of coated paper include, but are not particularly limited to, actual printing paper such as art paper, coated paper, matte paper, and the like.

Examples of the non-absorptive recording medium include, but are not particularly limited to, films and plates of plastics, such as polyvinyl chloride, polyethylene, polypropylene, polyethylene terephthalate (PET), polycarbonate, polystyrene, polyurethane, and the like; plates of metals such as iron, silver, copper, aluminum, and the like; metal plates and plastic-made films produced by vapor deposition of these metals, plates of alloys such as stainless, brass, and the like; recording media each including a paper-made substrate bonded to (coated with) a film of plastic, such as polyvinyl chloride, polyethylene, polypropylene, polyethylene terephthalate (PET), polycarbonate, polystyrene, polyurethane, or the like; and the like.

The "low-absorptive recording medium" or "non-absorptive recording medium" represents a recording medium having a water absorption amount of 10 mL/m$^2$ or less from the contact start to 30 msec in the Bristow method. The Bristow method is a method most popularized as a method for measuring a liquid absorption amount within a short time and is also used in "Japan Technical Association of the Pulp and Paper Industry" (JAPAN TAPPI). The details of the test method are described in "Standard No. 51—Paper and Paperboard—Liquid Absorption Test Method—Bristow method" of JAPAN TAPPI PAPER AND PULP TEST METHODS, 2000.

3. Recording Apparatus

FIG. 1 shows a perspective view of a serial printer as an example of an ink jet apparatus. As shown in FIG. 1, a serial printer 20 includes a transport section 220 and a recording section 230. The transport section 220 transports a recording medium F fed to the serial printer to the recording section 230 and discharges the recording medium after recording to the outside of the serial printer. Specifically, the transport section 220 has rollers for transporting the fed recording medium F in the sub-scanning direction T1.

Also, the recording section 230 includes a carriage 234 mounted with an ink jet head 231 having a nozzle line which ejects the ink composition to the recording medium fed from the transport section 220, and a carriage moving mechanism 235 which moves the carriage 234 in the main scanning direction S1/S2 of the recording medium F. The nozzle line is, but is hidden in the drawing, provided on the lower surface of the ink jet head 231 and has a plurality of nozzles arranged along the sub-scanning direction.

The serial printer is provided with, as the ink jet head 231, an ink jet head having a length smaller than the width of the recording medium, and recording is performed in plural passes (multi-pass) by movement of the ink jet head. Also, in the serial printer, the ink jet head 231 is mounted on the carriage 234 moved in a predetermined direction, and the ink composition is ejected to the recording medium by movement of the ink jet head with movement of the carriage. Therefore, recording is performed in two or more passes (multi-pass). In addition, "pass" is also referred to as "main scanning". Further, sub-scanning is performed between the passes to transport the recording medium. That is, main scanning and sub-scanning are performed alternately. That is, main scanning and sub-scanning are each performed a plurality of times.

In addition, the ink jet apparatus according to the present embodiment is not limited to the serial-type printer described above and may be a line-type printer. The line-type printer is a printer performing recording on the recording medium by one time of scanning using a line head serving as an ink jet head having a length equal to or larger than the width of the recording medium.

Figure 2:
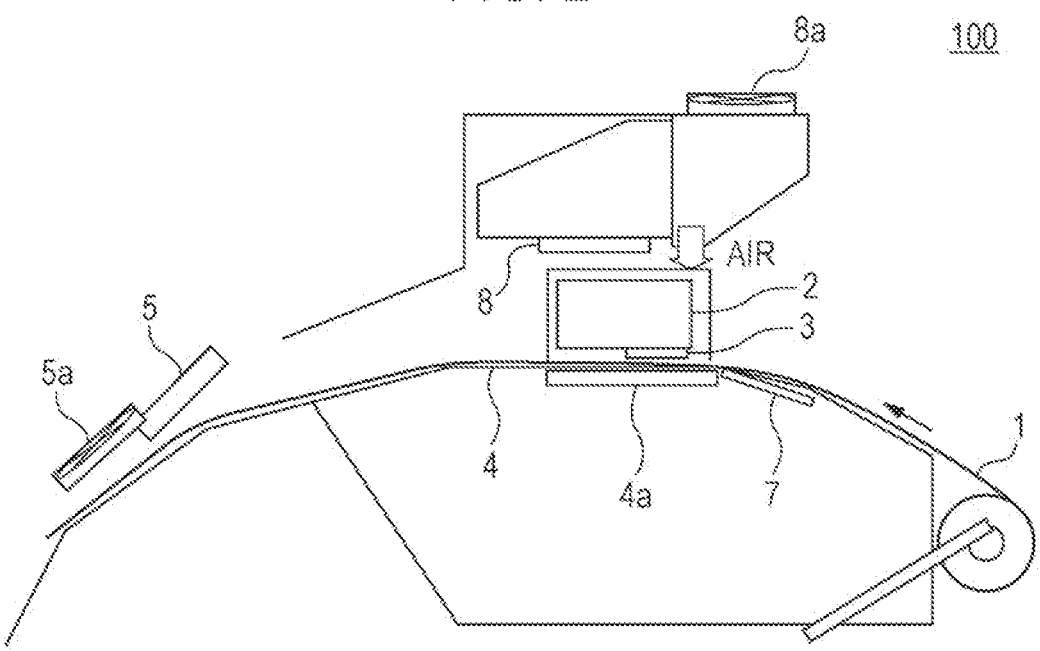
FIG. 2 is a schematic side view of an ink jet recording apparatus which can be used in an embodiment of the present disclosure.

FIG. 2 is a side view of the periphery of the ink jet head of the ink jet apparatus shown in FIG. 1. The ink jet apparatus 100 includes a carriage 2, an ink jet head 3, a platen 4, a platen heater 4a, a preheater 7, an IR heater 8, an air blowing fan 8a, an after heater 5, and a cooling fan 5a. Recording is performed on a recording medium 1.

The conduction type using the platen heater 4a and the preheater 7, the radiation type using the IR heater 8, and the air blowing type using the air blowing fan 8a can be used as the drying mechanism used in the primary drying step. The primary drying step is performed by using at least any one of these types. The air blowing by the air blowing fan 8a can accelerate evaporation by blowing air to the ink adhered to the recording medium near the position facing the ink jet head 3 in the recording medium transport direction. The after heater 5 is a drying mechanism used in the secondary drying step.

EXAMPLES

The present disclosure is more specifically described by using examples and comparative examples below. The present disclosure is not limited to the examples below.

1. Preparation of Ink Composition

Components were mixed so as to provide the compositions shown in Tables 1 and 2 below, preparing ink compositions. In Tables 1 and 2, each of the compositions is represented by "% by mass". Also, in the tables, a pigment and resin particles are each represented in terms of solid content. In addition, the pigment was previously mixed with a dispersant, which was a water-soluble styrene-acrylic resin, at the mass ratio of pigment:dispersant=2:1 in water and then stirred to prepare a pigment dispersion liquid, which was used for preparing the ink compositions.

TABLE 1

|  |  | White ink | | | | | | |
|---|---|---|---|---|---|---|---|---|
|  |  | W01 | W02 | W04 | W06 | W08 | W09 | W10 |
| White coloring material | Titanium dioxide | 10.0 | 10.0 | 10.0 | 14.0 | 10.0 | 10.0 | 10.0 |
| Resin particle | Joncryl 537J | 5.0 | 5.0 | 5.0 | 5.0 | 5.0 | 5.0 | 5.0 |
| Wax | AQUACER539 | 1.0 | 1.0 | 1.0 | 1.0 | 1.0 | 1.0 | 1.0 |
| Organic solvent | Propylene glycol (bp: 188° C.) | 11.0 | 11.0 | 11.0 | 11.0 | 11.0 | 11.0 | 7.0 |
|  | 1,3-Butanediol (bp: 207° C.) | 2.0 | 2.0 | 2.0 | 2.0 | 2.0 | 2.0 | 4.0 |
|  | 1,5-Pentanediol (bp: 239° C.) | 2.0 | 2.0 | 2.0 | 2.0 | 2.0 | 2.0 | 4.0 |
|  | Glycerin (bp: 290° C.) |  |  |  |  |  |  |  |
|  | 1,2-Hexanediol (bp: 223° C.) | 4.0 | 4.0 | 4.0 | 4.0 | 4.0 | 4.0 | 4.0 |
| Silicone-based surfactant A | BYK333 |  |  |  | 1.0 |  |  |  |
| Silicone-based surfactant B | KF-6204 (HLB: 10) | 1.0 |  | 1.0 | 1.0 | 0.5 |  | 1.0 |
|  | Tegowet280 (HLB: 3.5) |  | 1.0 |  |  |  |  |  |
|  | Tegowet270 (HLB: 2.5) |  |  |  |  |  | 1.0 |  |
| Other surfactant | SAG503A (HLB: 11) |  |  |  |  |  |  |  |
|  | PD002W |  |  |  |  |  |  |  |
|  | Water | Balance | Balance | Balance | Balance | Balance | Balance | Balance |
|  | Total | 100 | 100 | 100 | 100 | 100 | 100 | 100 |
|  | Total amount of organic solvent | 19 | 19 | 19 | 19 | 19 | 19 | 19 |
|  | Ratio of solvent with b. p. of less than 200° C. (% by mass, relative to total of organic solvent) | 58 | 58 | 58 | 58 | 58 | 58 | 37 |

|  |  | White ink | | | | | |
|---|---|---|---|---|---|---|---|
|  |  | W11 | W12 | W13 | W03 | W05 | W07 |
| White coloring material | Titanium dioxide | 10.0 | 10.0 | 10.0 | 10.0 | 10.0 | 10.0 |
| Resin particle | Joncryl 537J | 5.0 | 5.0 | 5.0 | 5.0 | 5.0 | 5.0 |
| Wax | AQUACER539 | 1.0 | 1.0 | 1.0 | 1.0 | 1.0 | 1.0 |
| Organic solvent | Propylene glycol (bp: 188° C.) | 19.0 | 11.0 | 14.0 | 11.0 | 11.0 | 11.0 |
|  | 1,3-Butanediol (bp: 207° C.) | 5.0 | 1.0 | 1.0 | 2.0 | 2.0 | 2.0 |
|  | 1,5-Pentanediol (bp: 239° C.) | 5.0 | 1.0 | 1.0 | 2.0 | 2.0 | 2.0 |
|  | Glycerin (bp: 290° C.) |  | 2.0 |  |  |  |  |
|  | 1,2-Hexanediol (bp: 223° C.) | 4.0 | 4.0 | 3.0 | 4.0 | 4.0 | 4.0 |
| Silicone-based surfactant A | BYK333 |  |  |  | 1.0 |  |  |
| Silicone-based surfactant B | KF-6204 (HLB: 10) | 1.0 | 1.0 | 1.0 |  |  |  |
|  | Tegowet280 (HLB: 3.5) |  |  |  |  |  |  |
|  | Tegowet270 (HLB: 2.5) |  |  |  |  |  |  |
| Other surfactant | SAG503A (HLB: 11) |  |  |  |  |  | 1.0 |
|  | PD002W |  |  |  |  | 1.0 |  |
|  | Water | Balance | Balance | Balance | Balance | Balance | Balance |
|  | Total | 100 | 100 | 100 | 100 | 100 | 100 |
|  | Total amount of organic solvent | 33 | 19 | 19 | 19 | 19 | 19 |
|  | Ratio of solvent with b. p. of less than 200° C. (% by mass, relative to total of organic solvent) | 58 | 58 | 74 | 58 | 58 | 58 |

TABLE 2

| | | Non-white ink | | | | | | | | |
|---|---|---|---|---|---|---|---|---|---|---|
| | | C01 | C02 | C03 | C04 | C07 | C08 | C09 | C05 | C06 |
| Non-white coloring material | P.B.15: 3 | 4.0 | 4.0 | 4.0 | 4.0 | 4.0 | 4.0 | 4.0 | 4.0 | 4.0 |
| Resin particle | Joncryl 537J | 3.0 | 3.0 | 3.0 | 3.0 | 3.0 | 3.0 | 3.0 | 3.0 | 3.0 |
| Wax | AQUACER539 | 1.0 | 1.0 | 1.0 | 1.0 | 1.0 | 1.0 | 1.0 | 1.0 | 1.0 |
| Organic solvent | Propylene glycol (bp: 188° C.) | 11.0 | 11.0 | 11.0 | 11.0 | 11.0 | 11.0 | 11.0 | 11.0 | 11.0 |
| | 1,3-Butanediol (bp: 207° C.) | 2.0 | 2.0 | 2.0 | 2.0 | 2.0 | 2.0 | 2.0 | 2.0 | 2.0 |
| | 1,5-Pentanediol (bp: 239° C.) | 2.0 | 2.0 | 2.0 | 2.0 | 2.0 | 2.0 | 2.0 | 2.0 | 2.0 |
| | 1,2-Hexanediol (bp: 223° C.) | 4.0 | 4.0 | 4.0 | 4.0 | 4.0 | 4.0 | 4.0 | 4.0 | 4.0 |
| Silicone-based surfactant A | BYK333 | 1.0 | 1.0 | | | 1.0 | 1.0 | 0.5 | | |
| | Preparation Example 1 | | | 1.0 | | | | | | |
| | BYK3480 | | | | 1.0 | | | | | |
| Silicone-based surfactant B | KF-6204 (HLB = 10) | 1.0 | | 1.0 | 1.0 | | | 1.0 | | |
| | Tegowet280 (HLB = 3.5) | | 1.0 | | | | | | | |
| Other surfactant | SAG503A (HLB = 11) | | | | | | 1.0 | | 1.0 | |
| | PD002W (acetylene glycol-based) | | | | | | | | | 1.0 |
| | Water | Balance | Balance | Balance | Balance | Balance | Balance | Balance | Balance | Balance |
| | Total | 100 | 100 | 100 | 100 | 100 | 100 | 100 | 100 | 100 |
| Total amount of organic solvent | | 19 | 19 | 19 | 19 | 19 | 19 | 19 | 19 | 19 |
| Ratio of solvent with b. p. of less than 200° C. (% by mass, relative to total of organic solvent) | | 58 | 58 | 58 | 58 | 58 | 58 | 58 | 58 | 58 |

The materials shown in Tables 1 and 2 are as follows.

Pigment
  White coloring material: titanium dioxide
  Non-white coloring material: Pigment Blue 15:3 Resin particles
  Joncryl 537J (acrylic resin particles, manufactured by BASF Corporation) Organic solvent (boiling point)
  Propylene glycol (standard boiling point: 188° C.)
  1,3-Butanediol (standard boiling point: 207° C.)
  1,5-Pentanediol (standard boiling point: 239° C.)
  Glycerin (standard boiling point: 290° C.)
  1,2-Hexanediol (standard boiling point: 223° C.) Silicone-based surfactant A
  BYK 333 (maximum peak: 6760) manufactured by BYK Chemie Japan K. K.
  Preparation Example 1 (maximum peak: 6500)
  BYK 3480 (maximum peak: 4330) manufactured by BYK Chemie Japan K. K.
Silicone-Based Surfactant B (HLB)
  KF-6204 (maximum peak: less than 3000, HLB: 10) manufactured by Shin-Etsu Chemical Co., Ltd.
  Tegowet 280 (maximum peak: less than 3000, HLB: 3.5) manufactured by EVONIK Industries Inc.
  Tegowet 270 (maximum peak: less than 3000, HLB: 2.5) manufactured by EVONIK Industries Inc.
Other Surfactants
  SAG503A (HLB: 11, maximum peak: less than 3000, manufactured by Shin-Etsu Chemical Co., Ltd., silicone-based surfactant, Silface SAG503A)
  PD002W (manufactured by Shin-Etsu Chemical Co., Ltd., acetylene glycol-based surfactant, Olfine PD002W) Water
  Ion exchange water

1. 1. Preparation Example 1 (Silicone-Based Surfactant B)

Predetermined organohydrogen polysiloxane was reacted with polyether having the corresponding carbon-, carbon double bond at a molecular terminal under a platinum catalyst. As a result of structural analysis by a liquid chromatography mass analyzer (LC-MS), the silicone-based surfactant B of Preparation Example 1 was obtained, which satisfied d=4 to 6, e=13 to 15, f=4 to 12, g=0, $R^3$=$CH_3$, $R^4$=—$CH_2$—, and $R^5$=H in the general formula (3) described above.

1. 2. Measurement of Molecular Weight Distribution

The molecular weight distribution of each of the silicone-based surfactant A and silicone-based surfactant B shown in Tables 1 and 2 was measured by gel permeation chromatography, and a maximum peak was obtained within a molecular weight range of 300 or more. The measurement conditions were as follows.

Measurement conditions
  Solvent: tetrahydrofuran
  Column: TSKgel SuperHZM-N×2+TSKgel guard column SuperHZ-L
  Column Temperature: 40° C.
  Filling amount: 25 μL Detector: differential refractive index (RI)
Flow rate: 0.35 mL/min
Calibration curve: a calibration curve obtained by using 13 samples of standard polystyrene STK standard polystyrene (manufactured by Tosoh Corporation) with Mw=1000000 to 500 was used.

2. Evaluation Method

A printer (modified machine of SC-S80650 manufactured by Seiko Epson Corporation) was prepared, and one nozzle line of the ink jet head was filled with each of the ink compositions. The ink jet head of the printer used had the nozzle line having a nozzle density of 360 dpi and 360 nozzles. In addition, the printer had a platen heater for primary drying at a position facing the ink jet head and was controlled so that the surface temperature of the recording medium became a value described in Tables 3 to 5. Further, a secondary heater was provided on the downstream in the printer and adjusted so that the surface temperature of the recording medium became 70° C. in secondary drying. In this example, a platen heater and an air blowing fan were provided as a secondary drying mechanism, and the air speed of the fan was adjusted to a value shown in the tables. The air speed was a air speed near the surface of the recording medium directly below the ink jet head. The air temperature was measured in advance near the surface of the recording medium so as not to be affected by the platen heater.

By using the printer configured as described above, a solid pattern was recorded with a recording resolution of 720×720 dpi on PET50A (manufactured by Rintech Inc., transparent PET film) under the conditions described in Tables 3 to 5. In this case, a method for ejecting the white ink composition and the non-white ink composition from the ink jet head was performed by the following two methods. In any one of the methods, the ink adhesion amount was set to a value in the tables by adjusting the number of ink droplets per pass.

Lamination Impact

The nozzles for the white ink composition were disposed upstream the nozzles for the non-white ink composition in the media transport direction, and the white ink composition was first recorded with the number of passes shown in the tables. Next, the non-white ink composition was recorded to be superposed in the same region with the number of passes shown in the tables. Tables 3 and 4 show the examples and comparative examples relating to lamination impact.

Simultaneous Impact

Of a plurality of nozzle lines arranged in parallel in the main scanning direction in the ink jet head, the first nozzle line was filled with the white ink composition, and the second nozzle line was filled with the non-white ink composition. Thus, the white ink composition and the non-white ink composition were simultaneously recorded on the same region. Table 5 shows the examples and comparative examples relating to simultaneous impact.

2. 1. Image Quality (Visibility)

The recorded matter obtained as described above was placed on black paper, and easy visibility of the image was visually observed from the side to which the non-white ink composition was adhered. Thus, visibility was evaluated according to evaluation criteria below. When the white ink composition was adhered in a small amount or when the white ink composition was hardly wet and spread, the black of the lower black paper was seen through due to the insufficient concealability of the image, and thus the image had low visibility. When the white ink composition adhered had a high solid content, visibility tends to be good.

Evaluation Criteria
A: The image is easily observed with easy visibility.
B: The blackish image is observed with easy visibility.
C: The black image is observed with visibility.
D: The black image is observed with low visibility.

2. 2. Image Quality (OD Value)

The OD value of the solid image of the recorded matter obtained as described above was measured by using a colorimeter (ilpro2, manufactured by X-rite Inc.) under measurement conditions below, and color development was evaluated according to evaluation criteria below. Mixing of the white ink with the non-white ink decreased the OD value.

Measurement Conditions
Measurement apparatus: ilPro2 (manufactured by X-rite Inc.)
Measurement conditions: D50 light source, status T, standard observer 2°
Background: white paper
Evaluation Criteria
A: The OD value is 1 or more.
B: The OD value is 0.8 or more and less than 1.
C: The OD value is 0.6 or more and less than 0.8.
D: The OD value is 0.4 or more and less than 0.6.

2. 3. Image Quality (Aggregation Unevenness)

The pattern image of the recorded matter obtained as described above was visually observed to observe the presence of bleed unevenness (aggregation unevenness due to gathering of adjacent ink droplets). The aggregation unevenness was evaluated according to evaluation criteria below.
Evaluation Criteria
A: Color shade unevenness is not observed in the pattern.
B: Fine shade unevenness is slightly observed.
C: Fine shade unevenness is significantly observed.
D: Large shade unevenness is observed.

2. 4. Abrasion Resistance

The recorded matter obtained as described above was tested (JIS P 8136) by 50 reciprocations of NO. 3 cloth of gold cloth with a load of 500 g using a Gakushin-type friction fastness tester AB-301 (manufactured by Tester Sangyo Co., Ltd.). The abrasion resistance was evaluated according to the following evaluation criteria.
Evaluation Criteria
A: No peeling is present in the image.
B: Peeling is present in over 0% and less than 10% of the image.
C: Peeling is present in 10% or more and less than 40% of the image.
D: Peeling is present in 40% or more of the image.

2. 5. Productivity

In the case of lamination impact, a total number of passes of the white ink and the non-white ink was used, while in the case of simultaneous impact, the number of passes for simultaneous impact was used. The number of passes necessary for recording was used as an index of productivity. The evaluation criteria for productivity are shown below.

Evaluation Criteria
A: 8 passes or less
B: 9 to 12 passes
C: 13 to 16 passes
D: 17 passes or more 3. Evaluation Results

TABLE 3

|  |  | Example |  |  |  |  |  |  |  |
|---|---|---|---|---|---|---|---|---|---|
|  |  | 1 | 2 | 3 | 4 | 5 | 6 | 7 | 8 |
| White ink | Type | W01 | W02 | W04 | W06 | W08 | W09 | W10 | W11 |
|  | Adhesion amount mg/inch2 | 6 | 6 | 6 | 6 | 6 | 6 | 6 | 6 |
|  | Number of passes | 8 | 8 | 8 | 8 | 8 | 8 | 8 | 8 |
| Non-white ink | Type | C01 | C01 | C01 | C01 | C01 | C01 | C01 | C01 |
|  | Adhesion amount mg/inch2 | 6 | 6 | 6 | 6 | 6 | 6 | 6 | 6 |
|  | Number of passes | 8 | 8 | 8 | 8 | 8 | 8 | 8 | 8 |
|  | Adhesion mode | Lamination | Lamination | Lamination | Lamination | Lamination | Lamination | Lamination | Lamination |
|  | Adhesion amount ratio (white/non-white) | 1 | 1 | 1 | 1 | 1 | 1 | 1 | 1 |
|  | Surface temperature of recording medium in primary drying (° C.) | 45 | 45 | 45 | 45 | 45 | 45 | 45 | 45 |
|  | Air blowing (air speed m/s) | 2 | 2 | 2 | 2 | 2 | 2 | 2 | 2 |
|  | Air temperature (° C.) | 25 | 25 | 25 | 25 | 25 | 25 | 25 | 25 |
| Evaluation | Image quality (visibility) | B | A | C | A | C | A | A | B |
|  | Image quality (OD value) | B | C | C | B | A | C | C | C |
|  | Image quality (aggregation unevenness) | B | B | B | B | A | C | C | C |
|  | Abrasion resistance | A | A | A | B | B | A | B | B |
|  | Productivity | C | C | C | C | C | C | C | C |

|  |  | Example |  |  |  |  |  |  |  |
|---|---|---|---|---|---|---|---|---|---|
|  |  | 9 | 10 | 11 | 12 | 13 | 14 | 15 | 30 |
| White ink | Type | W12 | W01 | W01 | W01 | W01 | W01 | W01 | W13 |
|  | Adhesion amount mg/inch2 | 6 | 6 | 6 | 6 | 6 | 6 | 6 | 6 |
|  | Number of passes | 8 | 8 | 8 | 8 | 8 | 8 | 8 | 8 |
| Non-white ink | Type | C01 | C02 | C03 | C04 | C07 | C08 | C09 | C01 |
|  | Adhesion amount mg/inch2 | 6 | 6 | 6 | 6 | 6 | 6 | 6 | 6 |
|  | Number of passes | 8 | 8 | 8 | 8 | 8 | 8 | 8 | 8 |
|  | Adhesion mode | Lamination | Lamination | Lamination | Lamination | Lamination | Lamination | Lamination | Lamination |
|  | Adhesion amount ratio (white/non-white) | 1 | 1 | 1 | 1 | 1 | 1 | 1 | 1 |
|  | Surface temperature of recording medium in primary drying (° C.) | 45 | 45 | 45 | 45 | 45 | 45 | 45 | 45 |
|  | Air blowing (air speed m/s) | 2 | 2 | 2 | 2 | 2 | 2 | 2 | 2 |
|  | Air temperature (° C.) | 25 | 25 | 25 | 25 | 25 | 25 | 25 | 25 |
| Evaluation | Image quality (visibility) | B | B | B | B | C | C | C | B |
|  | Image quality (OD value) | C | B | C | C | A | A | B | A |
|  | Image quality (aggregation unevenness) | C | B | B | C | B | A | B | A |

TABLE 3-continued

|  |  |  |  |  |  |  |  |  |
|---|---|---|---|---|---|---|---|---|
| Abrasion resistance | C | A | A | A | A | A | A | A |
| Productivity | C | C | C | C | C | C | C | C |

TABLE 4

|  |  | Example |  |  |  |  |  |  |
|---|---|---|---|---|---|---|---|---|
|  |  | 16 | 17 | 18 | 19 | 20 | 21 | 22 |
| White ink | Type | W01 | W01 | W01 | W01 | W01 | W01 | W01 |
|  | Adhesion amount mg/inch2 | 12 | 6 | 6 | 6 | 6 | 6 | 6 |
|  | Number of passes | 8 | 8 | 8 | 8 | 8 | 8 | 8 |
| Non-white ink | Type | C01 | C01 | C01 | C01 | C01 | C01 | C01 |
|  | Adhesion amount mg/inch2 | 6 | 6 | 6 | 6 | 6 | 6 | 6 |
|  | Number of passes | 8 | 8 | 8 | 8 | 8 | 8 | 8 |
| Adhesion mode |  | Lamination | Lamination | Lamination | Lamination | Lamination | Lamination | Lamination |
| Adhesion amount ratio (white/non-white) |  | 2 | 1 | 1 | 1 | 1 | 1 | 1 |
| Surface temperature of recording medium in primary drying (° C.) |  | 45 | 50 | 40 | 45 | 45 | 45 | 45 |
| Air blowing (air speed m/s) |  | 2 | 2 | 2 | 4 | 1 | 2 | 2 |
| Air temperature (° C.) |  | 25 | 25 | 25 | 25 | 25 | 30 | 20 |
| Evaluation | Image quality (visibility) | A | B | B | B | B | B | B |
|  | Image quality (OD value) | C | A | C | A | C | A | C |
|  | Image quality (aggregation unevenness) | B | A | C | A | C | A | C |
|  | Abrasion resistance | B | A | A | A | A | A | A |
|  | Productivity | C | C | C | C | C | C | C |

|  |  | Example | Comparative Example |  |  |  |  |  |
|---|---|---|---|---|---|---|---|---|
|  |  | 23 | 1 | 2 | 3 | 4 | 5 | 6 |
| White ink | Type | W01 | W03 | W05 | W07 | W01 | W01 | W07 |
|  | Adhesion amount mg/inch2 | 6 | 6 | 6 | 6 | 6 | 6 | 6 |
|  | Number of passes | 4 | 8 | 8 | 8 | 8 | 8 | 8 |
| Non-white ink | Type | C01 | C01 | C01 | C01 | C05 | C06 | C05 |
|  | Adhesion amount mg/inch2 | 6 | 6 | 6 | 6 | 6 | 6 | 6 |
|  | Number of passes | 4 | 8 | 8 | 8 | 8 | 8 | 8 |
| Adhesion mode |  | Lamination | Lamination | Lamination | Lamination | Lamination | Lamination | Lamination |
| Adhesion amount ratio (white/non-white) |  | 1 | 1 | 1 | 1 | 1 | 1 | 1 |
| Surface temperature of recording medium in primary drying (° C.) |  | 45 | 45 | 45 | 45 | 45 | 45 | 45 |
| Air blowing (air speed m/s) |  | 2 | 2 | 2 | 2 | 2 | 2 | 2 |
| Air temperature (° C.) |  | 25 | 25 | 25 | 25 | 25 | 25 | 25 |
| Evaluation | Image quality (visibility) | B | D | D | D | B | B | D |
|  | Image quality (OD value) | C | B | D | B | D | D | B |
|  | Image quality (aggregation unevenness) | C | A | A | A | B | D | B |

TABLE 4-continued

| | | | | | | | |
|---|---|---|---|---|---|---|---|
| Abrasion resistance | A | B | B | B | A | A | B |
| Productivity | A | C | C | C | C | C | C |

TABLE 5

| | | Example | | | | | | Comparative Example | |
|---|---|---|---|---|---|---|---|---|---|
| | | 24 | 25 | 26 | 27 | 28 | 29 | 7 | 8 |
| White ink | Type | W01 | W01 | W01 | W01 | W02 | W01 | W03 | W01 |
| | Adhesion amount mg/inch2 | 6 | 3 | 2 | 8 | 3 | 3 | 6 | 6 |
| Non-white ink | Type | C01 | C01 | C01 | C01 | C01 | C04 | C01 | C05 |
| | Adhesion amount mg/inch2 | 6 | 6 | 6 | 6 | 6 | 6 | 6 | 6 |
| | Adhesion mode | Simul-taneous | Simul-taneous | Simul-taneous | Simul-taneous | Simul-taneous | Simul-taneous | Simul-taneous | Simul-taneous |
| | Adhesion amount ratio (white/non-white) | 1 | 0.5 | 0.33 | 1.33 | 0.5 | 0.5 | 1 | 1 |
| | Surface temperature of recording medium in primary drying (° C.) | 45 | 45 | 45 | 45 | 45 | 45 | 45 | 45 |
| | Air blowing (air speed m/s) | 2 | 2 | 2 | 2 | 2 | 2 | 2 | 2 |
| | Air temperature (° C.) | 25 | 25 | 25 | 25 | 25 | 25 | 25 | 25 |
| | Number of passes | 8 | 8 | 8 | 8 | 8 | 8 | 8 | 8 |
| Evaluation | Simultaneous impact image quality (visibility) | C | C | C | B | B | C | D | C |
| | Simultaneous impact image quality (OD value) | C | B | A | C | C | C | C | D |
| | Productivity | A | A | A | A | A | A | A | A |

The evaluation results indicate that any one of the examples using the non-white ink composition containing the silicone-based surfactant A and the white ink composition containing the silicone-based surfactant B is excellent in terms of both image quality (visibility) and image quality (OD value). On the other hand, any one of the comparative examples not applying to this case is inferior in any one of image quality (visibility) and image quality (OD value). Further, comparison between the evaluation results of Examples 1 to 9 and the evaluation results of Comparative Example 1 indicates that when the white ink composition does not contain the silicone-based surfactant B, the visibility is poor.

Comparison between Examples 1 to 9 and Comparative Example 2 indicates that when the silicone-based surfactant is used as the surfactant, visibility is excellent.

Comparison between Examples 1 to 9 and Comparative Example 3 indicates that when the silicone-based surfactant having a HLB value of 10.5 or less is used, visibility is excellent.

Comparison between Example 1 and Example 3 suggests that when the content of the silicone-based surfactant A in the white ink composition is lower than that of the silicone-based surfactant B, visibility is excellent.

Comparison between Example 1 and Example 4 indicates that when the amount of the white ink contained in the white ink composition is 14% by mass, visibility is excellent as compared with the amount of 10% by mass.

Comparison between Example 1 and Example 5 indicates that when the content of the silicone-based surfactant B contained in the white ink composition is 0.5% by mass, visibility is excellent as compared with the content of 1.0% by mass.

Comparison between Example 1, Example 7, and Example 30 indicates that when the white ink composition contains the organic solvent having a standard boiling point of less than 200° C. in a large amount in all organic solvents, the OD value and aggregation unevenness are more excellent. Example 30 tends to show slightly more defects in ink ejection from the head tends to cause. When the amount of the organic solvent having a standard boiling point of less than 200° C. is not excessively large, ejection stability is more excellent. It is also suggested that the same results as above are obtained by the non-white ink composition.

Comparison between Example 1 and Example 9 indicates that when the solvent contained in the white ink composition contains glycerin, a system not containing glycerin is poor in terms of the OD value and aggregation unevenness. This suggests that when the white ink composition contains a solvent having a high boiling point, the OD value and aggregation unevenness are poor. Also, it is suggested that the same results as above are obtained by the non-white ink composition.

Comparison between Example 10 and Comparative Example 4 indicates that when the non-white ink composition does not contain the surfactant, the OD value is poor.

Comparison between Example 10 and Comparative Example 5 indicates that when the non-white ink composition does not contain the silicone-based surfactant A, the OD value is poor.

Comparison between Example 10 and Comparative Example 6 indicates that when the non-white ink composition does not contain the silicone-based surfactant B, the OD value is not degraded even when the non-white ink composition does not contain the silicone-based surfactant A. This suggests that when the non-white ink composition contains the silicone-based surfactant B and also contains the silicone-based surfactant A, an ink set having at least excellent visibility and OD value can be obtained.

Comparison between Example 10 and Example 13 indicates that when the non-white ink composition does not contain the silicone-based surfactant B, visibility is poor.

Comparison between Example 10 and Examples 17 and 18 indicates that the higher within a predetermined range the primary drying temperature in the drying step is, the more excellent the OD value and aggregation unevenness are.

Comparison between Example 10 and Examples 19 and 20 indicates that the higher within a predetermined range the air speed in the drying step is, the more excellent the OD value and aggregation unevenness are.

Comparison between Example 10 and Examples 21 and 22 indicates that the higher within a predetermined range the air temperature in the primary drying step is, the more excellent the OD value and aggregation unevenness are.

Comparison between Example 23 and Examples 24 indicates that in the case of simultaneous impact, as compared with the case of lamination impact, visibility is slightly poor, but the number of passes can be decreased and the productivity can be significantly improved.

What is claimed is:

1. An ink set comprising:
a non-white ink composition containing a non-white coloring material; and
a white ink composition containing a white coloring material,
wherein the non-white ink composition and the white ink composition are each an aqueous ink jet ink;
the non-white ink composition contains a silicone-based surfactant A having a maximum peak within a molecular weight range of 3,000 to 20,000 within a molecular weight range of 300 or more in a molecular weight distribution in gel permeation chromatography, a content of the silicone-based surfactant A relative to a total mass of the non-white ink composition is 0.1% by mass or more;
the white ink composition contains a silicone-based surfactant B having a HLB value of 10.5 or less by the Griffin method, but not having a maximum peak within a molecular weight range of 3,000 or more within a molecular weight range of 300 or more in a molecular weight distribution in gel permeation chromatography, a content of the silicone-based surfactant B relative to the total mass of the white ink composition is 0.3% by mass or more; and
a content of the silicone-based surfactant A relative to a total mass of the white ink composition is 0.05% by mass or less.

2. The ink set according to claim 1, wherein the content of the silicone-based surfactant A relative to the total mass of the non-white ink composition is 0.1 to 5.0% by mass, and the content of the silicone-based surfactant B relative to the total mass of the white ink composition is 0.3 to 5.0% by mass.

3. The ink set according to claim 1, wherein the non-white ink composition contains the silicone-based surfactant B.

4. The ink set according to claim 1, wherein the silicone-based surfactant A contains a compound having a structure of general formula (1) or general formula (3),

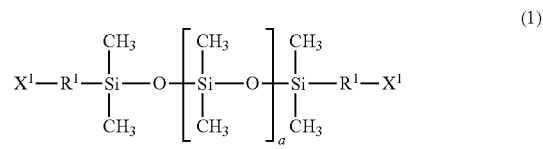

in the formula, $R^1$ each independently represent an alkylene group having 1 to 6 carbon atoms or a single bond, $X^1$ each independently represent a polyether group represented by general formula (2), and a represents an integer of 10 to 80,

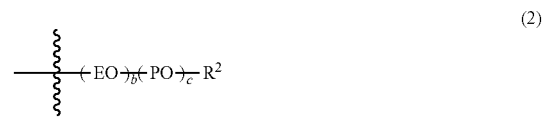

in the formula, $R^2$ represents a hydrogen atom, an alkyl group having 1 to 6 carbon atoms, or a (meth) acryl group, EO represents an ethylene oxide group, PO represents a propylene oxide group, EO and PO are in no particular order, b is an integer of 1 or more, c is an integer of 0 or more, and (b+c) is an integer of 1 or more,

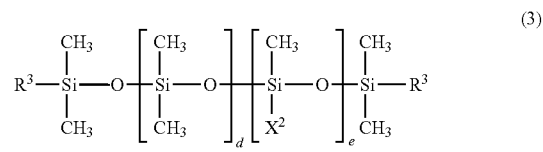

in the formula, $R^3$ each independently represent an alkyl group having 1 to 6 carbon atoms, $X^2$ each independently represent a polyether group represented by general formula (4), d and e are each an integer of 1 or more, and (d+e) is an integer of 2 to 50,

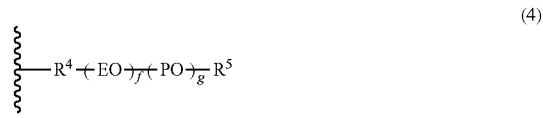

in the formula, $R^4$ represents an alkylene group having 1 to 6 carbon atoms or a single bond, $R^5$ represents a hydrogen atom or an alkyl group having 1 to 6 carbon atoms, EO represents an ethylene oxide group, PO represents a propylene oxide group, EO and PO are in no particular order, f is an integer of 1 or more, g is an integer of 0 or more, and f+g is an integer of 1 or more.

5. The ink set according to claim 1,
wherein the white ink composition contains 5% by mass or more and 30% by mass or less of an organic solvent relative to the total amount of the white ink composition; and
the non-white ink composition contains 5% by mass or more and 30% by mass or less of an organic solvent relative to the total amount of the non-white ink composition.

6. The ink set according to claim 1,
wherein the white ink composition contains an organic solvent having a standard boiling point of 170° C. to 250° C.; and
the non-white ink composition contains an organic solvent having a standard boiling point of 170° C. to 250° C.

7. The ink set according to claim 5,
wherein the white ink composition contains 30% to 80% by mass of an organic solvent having a standard boiling point of less than 200° C. in 100% by mass of an organic solvent; and
the non-white ink composition contains 30% to 80% by mass of an organic solvent having a standard boiling point of less than 200° C. in 100% by mass of an organic solvent.

8. The ink set according to claim 1,
wherein the white ink composition further contains resin particles; and
the non-white ink composition further contains resin particles.

9. A recording method for recording on a recording medium using the ink set according to claim 1, the method comprising:
a white ink adhering step of ejecting and adhering the white ink composition from an ink jet head to the recording medium; and
a non-white ink adhering step of ejecting and adhering the non-white ink composition from an ink jet head to the recording medium.

10. The recording method according to claim 9,
wherein in the white ink adhering step and the non-white ink adhering step, a white ink image formed by the white ink composition and a non-white ink image formed by the non-white ink composition are formed to be superposed on the recording medium.

11. The recording method according to claim 9,
wherein in the white ink adhering step and the non-white ink adhering step, main scanning is performed a plurality of times to eject and adhere the ink composition to the recording medium while moving the relative position of the ink jet head to the recording medium; and
in the main scanning, the white ink composition and the non-white ink composition are adhered to the same scanning region of the recording medium by the same main scanning operation.

12. The recording method according to claim 9,
wherein the white ink adhering step and the non-white ink adhering step include a step of performing main scanning a plurality of times for the same scanning region of the recording medium to eject and adhere the ink composition to the recording medium while moving the relative position of the ink jet head to the recording medium; and
the number of times of main scanning for the same scanning region is 8 or less.

13. The recording method according to claim 9, further comprising a primary drying step of drying, by a drying mechanism, the white ink composition and the non-white ink composition which are adhered to the recording medium.

14. The recording method according to claim 13, wherein in the primary drying step, the surface temperature of the recording medium is 45° C. or less.

\* \* \* \* \*